United States Patent
Ito

(10) Patent No.: US 12,361,684 B2
(45) Date of Patent: Jul. 15, 2025

(54) DATA COLLECTION SYSTEM

(71) Applicant: Hitachi Solutions, Ltd., Tokyo (JP)

(72) Inventor: Hidekazu Ito, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 374 days.

(21) Appl. No.: 17/917,158

(22) PCT Filed: Jan. 12, 2021

(86) PCT No.: PCT/JP2021/000694
§ 371 (c)(1),
(2) Date: Oct. 5, 2022

(87) PCT Pub. No.: WO2021/260979
PCT Pub. Date: Dec. 30, 2021

(65) Prior Publication Data
US 2023/0162482 A1     May 25, 2023

(30) Foreign Application Priority Data
Jun. 22, 2020 (JP) .................. 2020-107278

(51) Int. Cl.
*G06V 10/00*     (2022.01)
*G06V 10/12*     (2022.01)
(Continued)

(52) U.S. Cl.
CPC ............ *G06V 10/774* (2022.01); *G06V 10/12* (2022.01); *G06V 10/945* (2022.01); *G06F 3/0484* (2013.01)

(58) Field of Classification Search
CPC .... G06N 20/00; G06V 10/774; G06V 10/945; G06F 3/0484; G06T 7/00
See application file for complete search history.

(56) References Cited

U.S. PATENT DOCUMENTS 8,510,237 B2 *   8/2013   Cascaval ............... G06F 40/143
                                                          706/12
8,930,376 B2 *   1/2015   Singh .................. G06F 16/9562
                                                         707/748

(Continued)

FOREIGN PATENT DOCUMENTS

JP        2020-008904 A     1/2020

OTHER PUBLICATIONS

Katsushi et al.,"WO2019176354A1 Learning data collection method, learning data collection device, abnormality detection system, and computer program"; Publication Date: Sep. 19, 2019.*

*Primary Examiner* — Amir Alavi
(74) *Attorney, Agent, or Firm* — Foley & Lardner LLP

(57) ABSTRACT

The purpose of the present invention is to provide a data collection system capable of appropriately setting a range for collecting image data used as training data of a learning device that recognizes an image. A data collection system according to the present invention receives requirement variables that represent the requirement of image data necessary for a learning device to be sufficiently trained and requirement definition data that designates the requirement value, further receives priority data that designates the priority of the requirement variables, presents the requirement variables and the requirement values in the order of the priorities, and presents a requirement value response rate that represents the ratio of the requirement variables for which the requirement value is specified.

14 Claims, 16 Drawing Sheets

(51) Int. Cl.
  *G06V 10/774*  (2022.01)
  *G06V 10/94*   (2022.01)
  *G06F 3/0484*   (2022.01)

(56) References Cited

U.S. PATENT DOCUMENTS

| | | | |
|---|---|---|---|
| 9,235,652 B1 * | 1/2016 | Jeffery | G06F 16/254 |
| 9,413,779 B2 * | 8/2016 | Vasseur | G06N 20/00 |
| 9,552,535 B2 * | 1/2017 | Movellan | G06V 40/175 |
| 9,990,587 B2 * | 6/2018 | Okanohara | G06N 20/00 |
| 10,678,233 B2 * | 6/2020 | Cella | G05B 19/0425 |
| 10,712,738 B2 * | 7/2020 | Cella | H04W 4/38 |
| 10,983,507 B2 * | 4/2021 | Cella | G05B 19/4155 |
| 11,442,958 B2 * | 9/2022 | Savir | G06F 11/2097 |
| 11,669,636 B2 * | 6/2023 | Ewald | G06N 20/00 726/1 |
| 11,954,566 B2 * | 4/2024 | Ueno | G06F 18/214 |
| 2021/0264210 A1 | 8/2021 | Ueta et al. | |

* cited by examiner

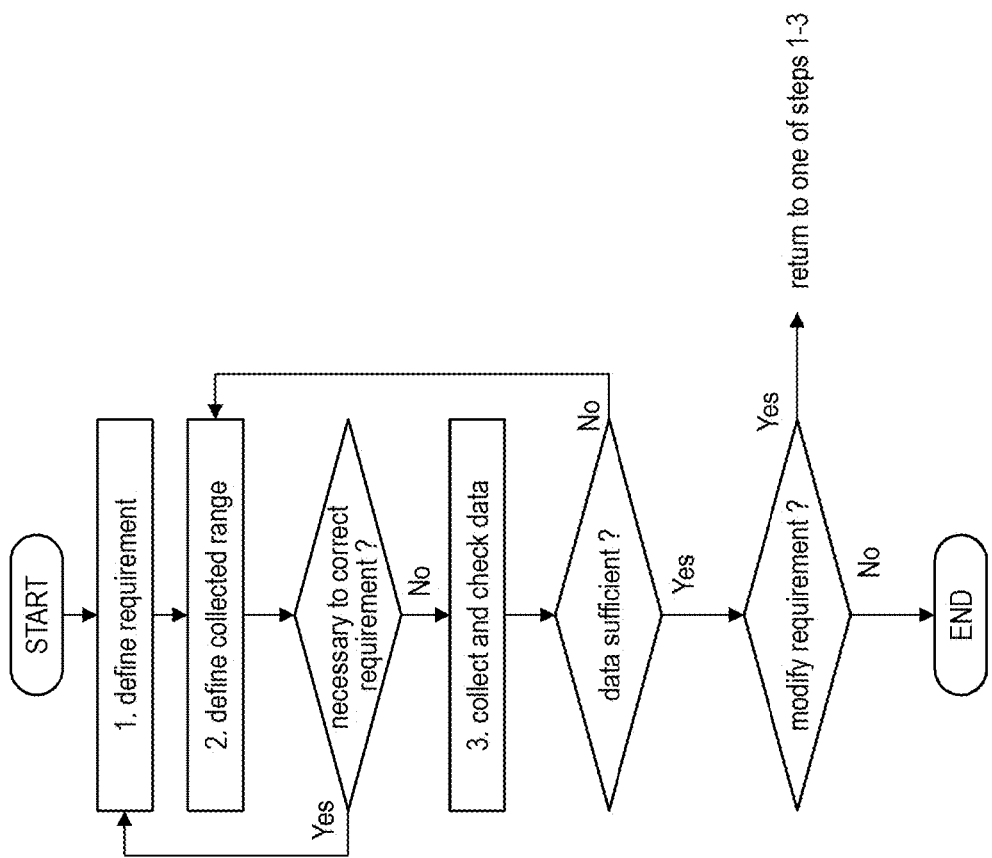

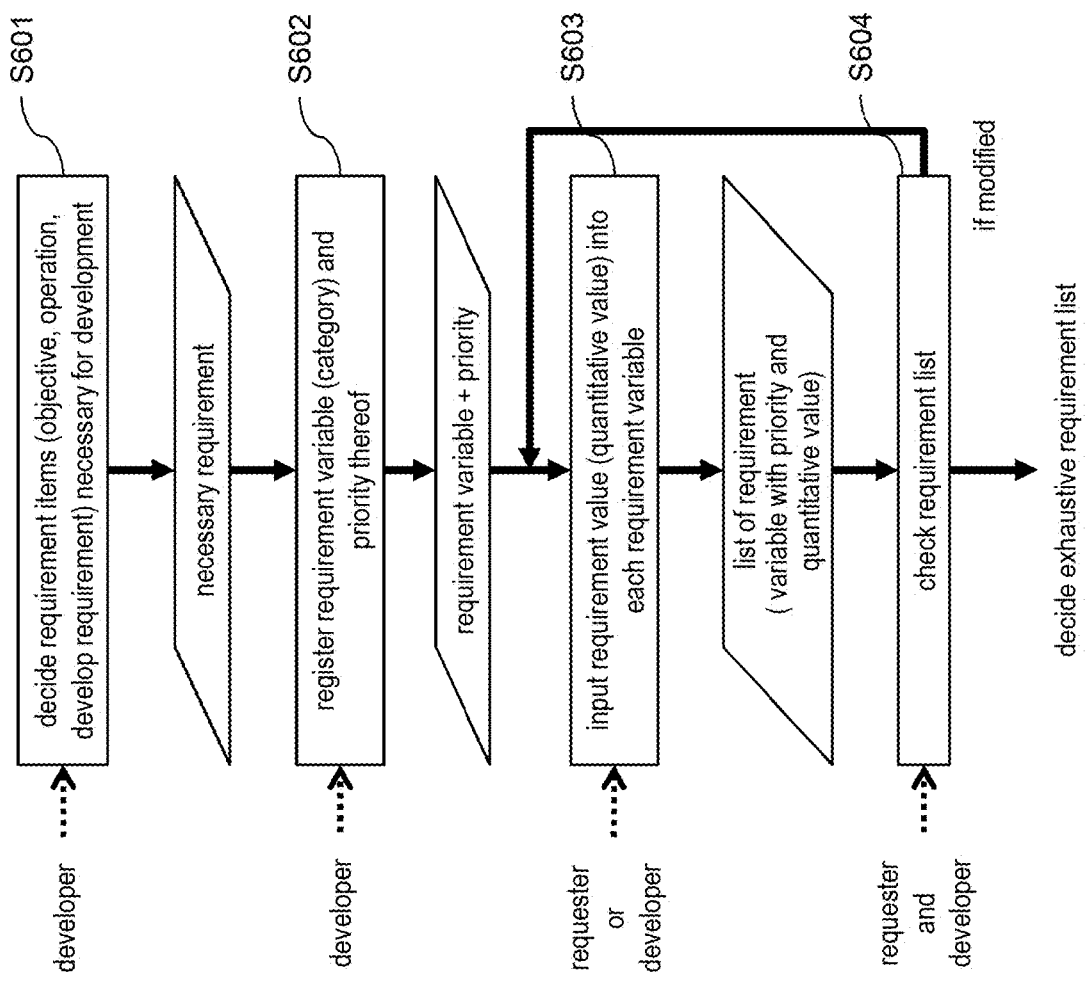

FIG. 7A

| category | abstract | characteristic; reason of categorize | target step to return if modified |
|---|---|---|---|
| objective requirement | actor and behavior | constant element (fixed in a project) | return to "1. define requirement" |
| operational requirement | when, where, how to use | temporally variable element (situation changes along with time, thus corrected following such change) | return to "2. define collected range" |
| develop requirement | what to do for achieving requirement | continuously improved element (improved along with continuous growth of AI, corrected continuously) | return to "3. collect and check data" |

FIG. 7B

| category | | conceptual image | requirement variable example | requirement value (quantitative value) example |
|---|---|---|---|---|
| objective requirement | target etc. | no item / item A / item B | • target camera (type)<br>• target AI (category)<br>• target (exist or not, item name) | • target camera = camera A<br>• target AI = categorizing AI<br>• target = identify : no item, item A (OK / NG) |
| operational requirement | external environment etc. | example of external environment (light area, dark area, imaging device, target, illumination information) | • date and time (operation date, operation time)<br>• location (indoor area, outdoor area)<br>• weather (brightness, temperature, rainfall amount)<br>• installed object (target, location, orientation) | • date and time = operate on 365days 9:00-18:00<br>• location = shot location fixed on indoor point A from azimuth 0 degree<br>• weather = sunny(50klx)-rain(1klx), night fluorescent light(500lx)<br>• installed object = item A or B installed on point A |
| | device config etc. | example of imaging device (camera information, illumination information) | • camera information (param, operational amount)<br>• illumination information (param, operational amount) | • camera information : zoom 1x fixed, pan 0-90 degree<br>• illumination information : illuminance 80%-100%, light color : white/red/blue |
| develop requirement | data amount etc. | variable A, variable B, variable C ... | • number of capture for each target<br>• capture ratio for each target<br>• number of capture for each variable<br>• capture ratio for each variable | • number of capture for each condition : 50,000<br>• capture ratio for each target : same ratio<br>* provisionally configured and then adjusted when evaluating AI |

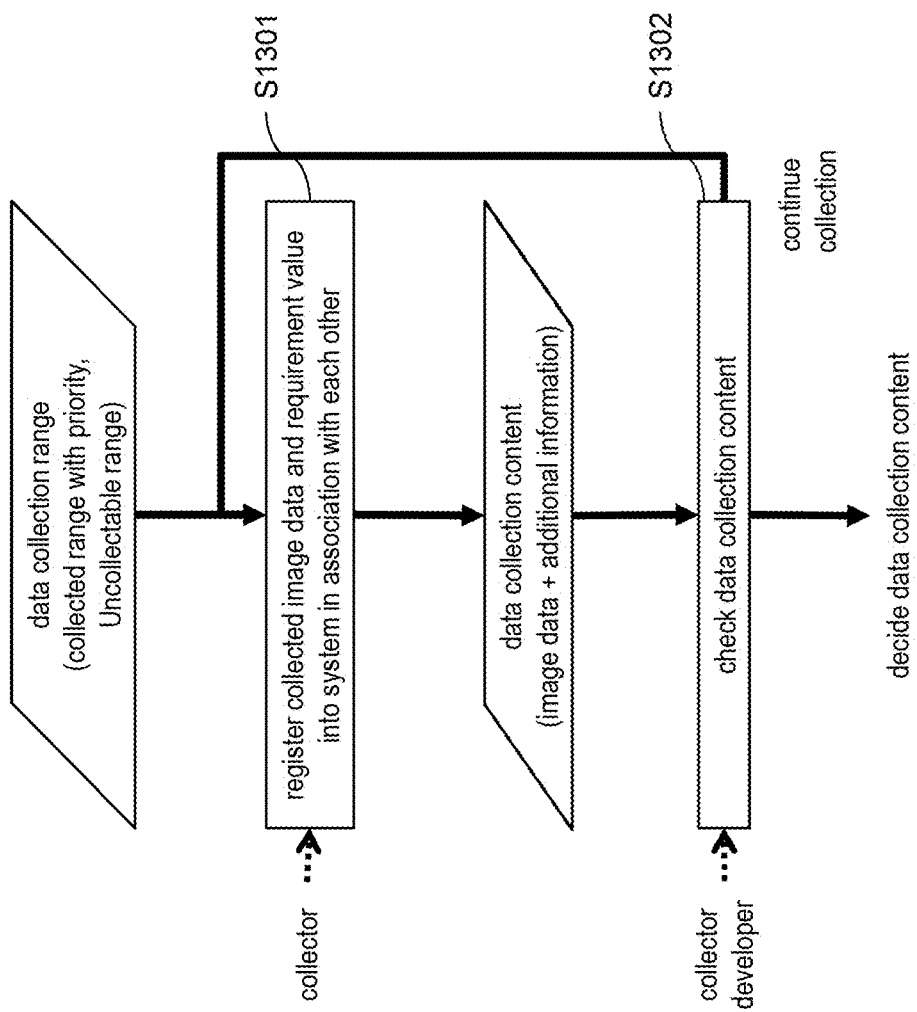

FIG. 14A
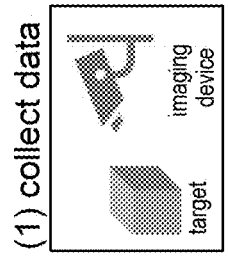
(1) collect data
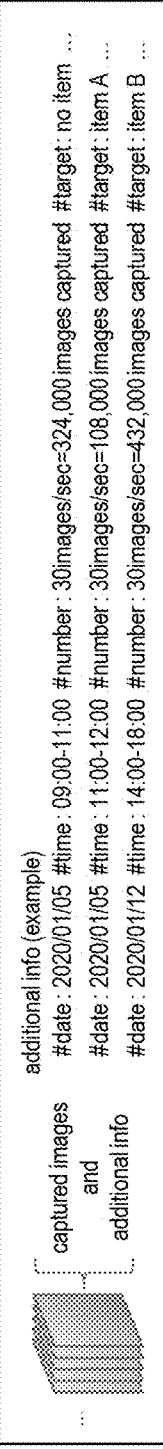
(2) collected data

FIG. 14B
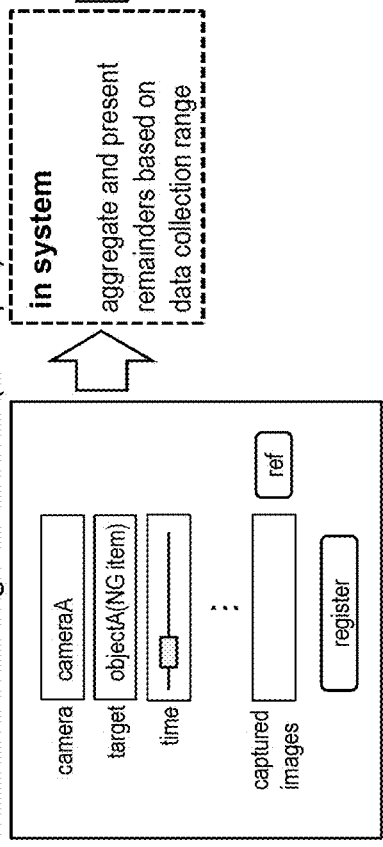
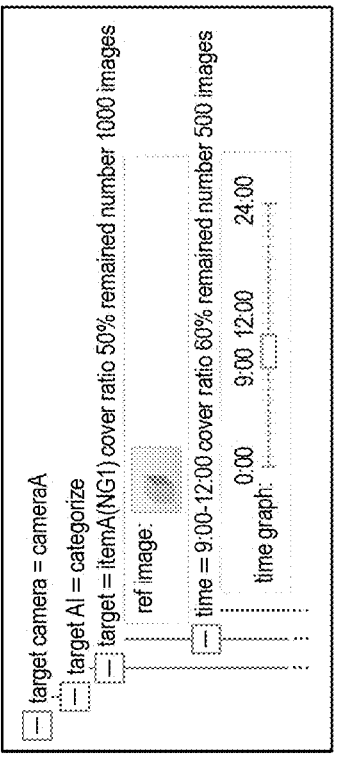
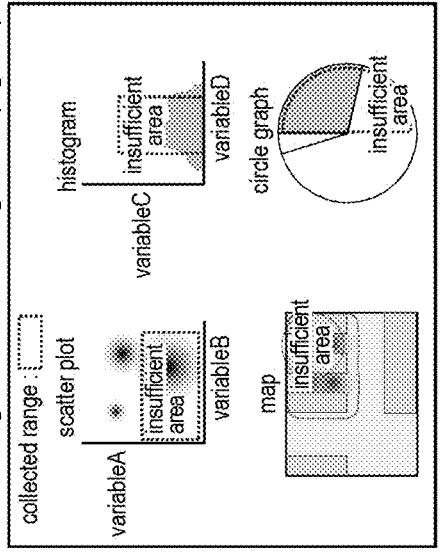

DATA COLLECTION SYSTEM

TECHNICAL FIELD

The present disclosure relates to a data collection system that collects image data used for learning process performed by a learner that identifies images by machine learning.

BACKGROUND ART

A learner that identifies images uses image data as learning data. In order to appropriately perform learning, it is desirable to collect appropriate learning data as much as possible. This is because amount or quality of image data which is collected as learning data is an important factor for determining quality of the learner. However, it depends on the developer of the learner what learning data should be collected, otherwise the learning data is collected on ad hoc basis in many cases. In addition, the collecting process may be performed in many cases by a person who has small experience of developing learner, which may lead into a consequence that appropriate data is not collected.

Patent Literature 1 below describes a technique for collecting learning data for a learner that identifies images. This literature describes a technical problem as: To suppress, during the collection of learning data used for image recognition, the collection of inappropriate photographic images that are unsuitable for learning; and also describes a solution as: A learning data collection device 3, wherein a processor 51 is configured to acquire a photographic image from a photographic device 2, determine whether the photographic image is suitable for the learning data, and execute a notification process for prompting a photographer to retake photographic images that were determined to be unsuitable for the learning data (refer to Abstract).

CITATION LIST

Patent Literature

Patent Literature 1: JP 2020-008904 A

SUMMARY OF INVENTION

Technical Problem

The technique in Patent Literature 1 determines whether the collected image data is appropriate. However, this literature does not clearly discuss how to define the collected range of the image data. In other words, this literature merely determines whether the collected image data is appropriate after collecting the image data. Thus this literature may not sufficiently consider defining the collected range appropriately.

The present disclosure has been made in view of the problems above, and an objective of the present disclosure is to provide a data collection system that can appropriately define a range in which image data is collected which is used as learning data for a learner that identifies images.

Solution to Problem

A data collection system according to the present disclosure: receives requirement definition data that specifies a requirement variable representing a requirement of image data necessary for a learner to sufficiently perform learning process, and that also specifies a requirement value of the requirement variable; receives priority data that specifies a priority of the requirement variable; presents the requirement variable and the requirement value according to an order of the priority; and present a requirement value answer ratio that represents a ratio of the requirement variable in which the requirement value is already specified.

Advantageous Effects of Invention

According to the data collection system of the present disclosure, it is possible to appropriately define a range in which image data is collected which is used as learning data for a learner that identifies images.

BRIEF DESCRIPTION OF DRAWINGS

FIG. 5 is a flowchart that explains an operation of the data collection system 10.

FIG. 6 is a process flow diagram that explains details of step 1.

FIG. 7A is a diagram that illustrates an example of requirement item.

FIG. 7B is a diagram that illustrates an example of requirement variable.

FIG. 13 is a process flow diagram that explains details of step 3.

FIG. 14A is a conceptual diagram of a work performed by a collector in S1301.

FIG. 14B is a diagram that illustrates an example of a registration screen used in S1301.

DESCRIPTION OF EMBODIMENTS

Embodiment 1

Figure 1:
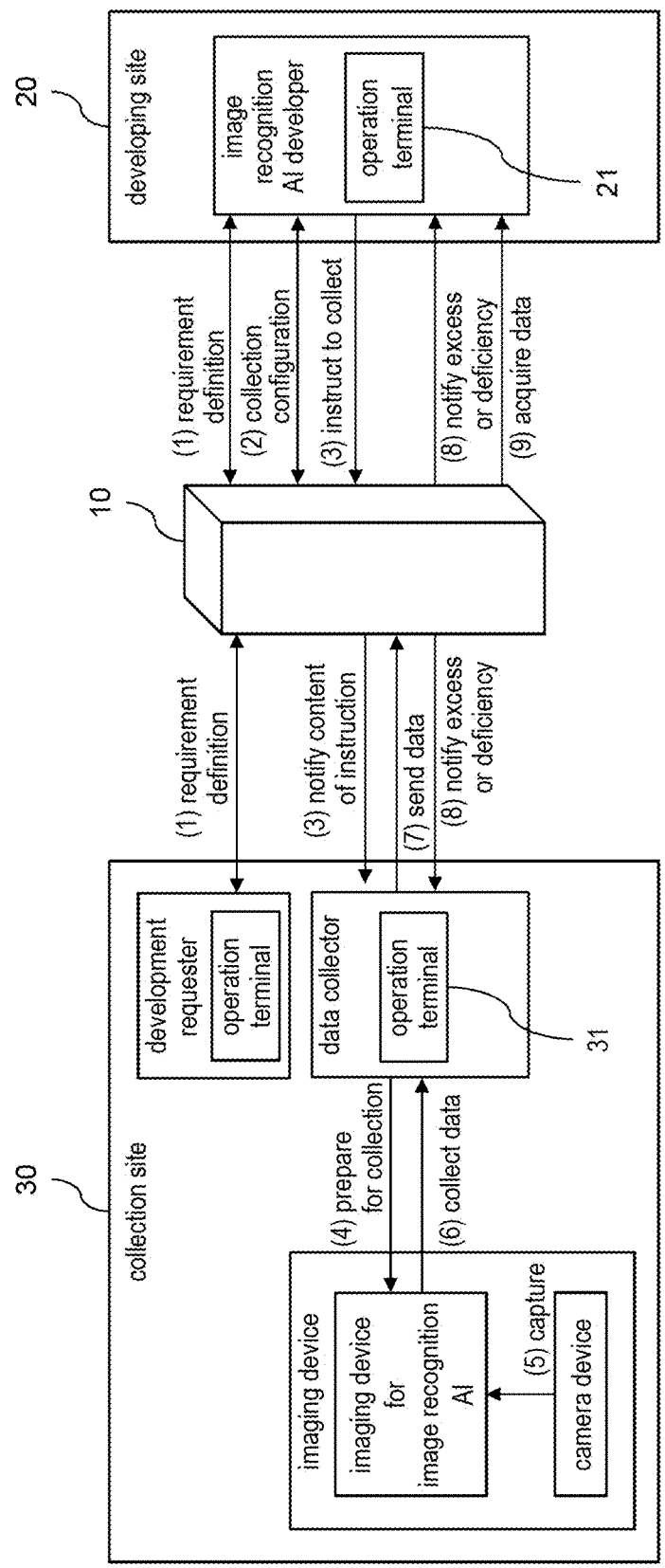
FIG. 1 is a configurational diagram of a data collection system 10 according to an embodiment 1.

FIG. 1 is a configurational diagram of a data collection system 10 according to an embodiment 1 of the present disclosure. The data collection system 10 is a system that collects learning data (hereinafter, also referred to as image data) used for a learner that identifies images. The data collection system 10 is accessed from a developing site 20 and a collection site 30 respectively. The developing site 20 is a place where developers of the learner work. An operation terminal 21 used by the developers is installed in the developing site 20. The collection site 30 is a place where a collector who collects image data performs collecting tasks. An operation terminal 31 is installed in the collection site 30. Each site is connected to each other by a network.

An overall operation sequence of the data collection system 10 will be described below. A developer defines, on the operation terminal 21, a requirement of learning data that is necessary for the learner to sufficiently perform the learning process ((1) requirement definition). This requirement definition is also notified to an operation terminal used by a requester who requests to develop the learner. The developer and the requester define a collection requirement by communicating with each other according to a flowchart described later.

The developer configures, on the operation terminal 21, a range in which the learning data is collected ((2) collection configuration). The requester may in some cases configure a constraint for collecting data. The developer and the requester configure a collected range by communicating with each other according to a flowchart described later.

The developer instructs, on the operation terminal 21, to start collecting learning data ((3) instruct to collect). The data collection system 10 notifies the contents of instruction to the collector ((3) notify content of instruction). The collector instructs, on the operation terminal 31, an imaging device to start collecting data ((4) prepare for collection). A camera device captures image data ((5) capture). The operation terminal 31 collects the captured image data ((6) collect data).

The operation terminal 31 sends the collected image data to the data collection system 10 ((7) send data). The data collection system 10 notifies the operation terminal 31 and the 210 of excess or deficiency of image data ((8) notify excess or deficiency). If the image data is not sufficient, the developer or the requester instruct collecting data again. If the image data is sufficient, the operation terminal 21 acquires the collected image data ((9) acquire data).

Figure 2:
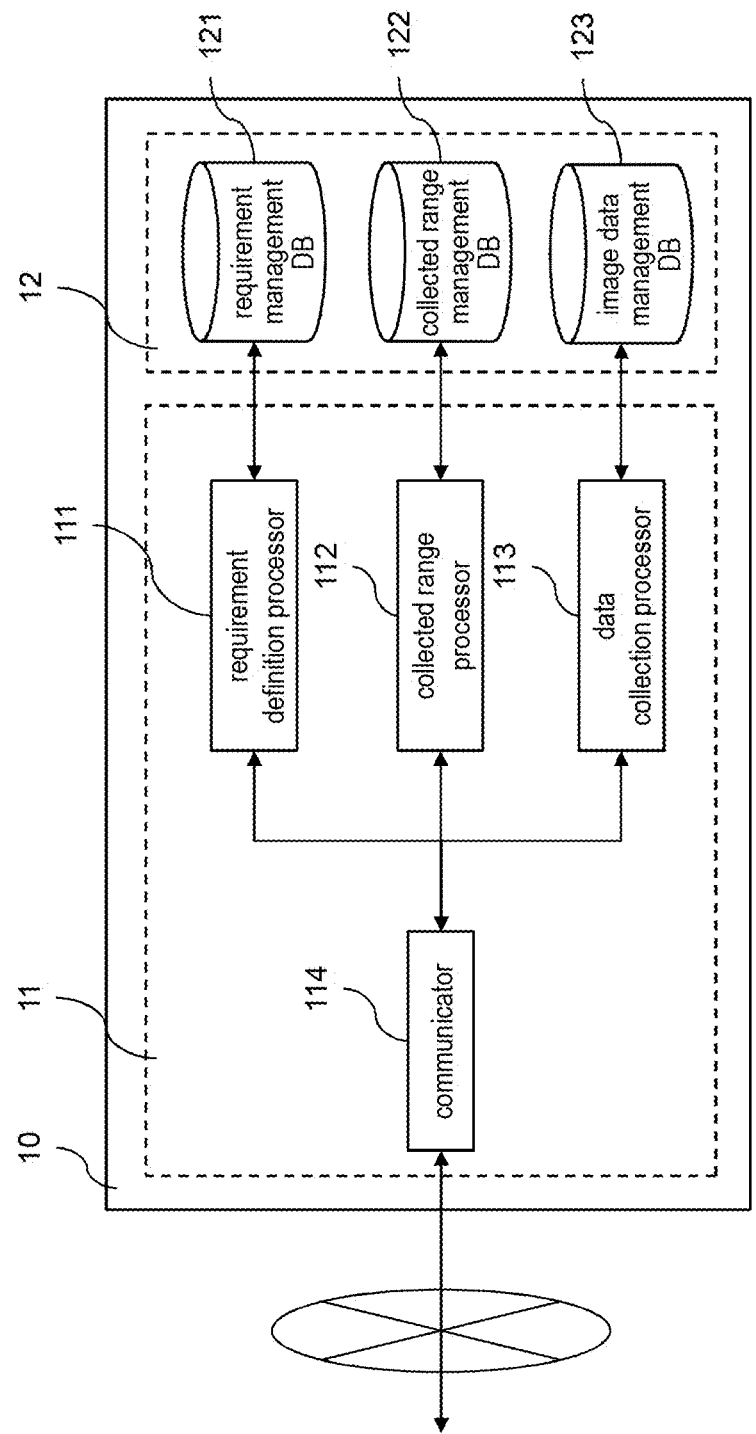
FIG. 2 is a function block diagram of the data collection system 10.

FIG. 2 is a function block diagram of the data collection system 10. The data collection system 10 includes a processor 11 and a storage unit 12. The processor 11 is a processor that executes software, such as CPU (Central Processing Unit). The storage unit 12 is a device that stores data, such as hard disk device.

The processor 11 executes a requirement definition processor 111, a collected range processor 112, a data collection processor 113, and a communicator 115. These functional units are configured as software modules executable by the processor 11.

The requirement processor 111 performs a process of when defining a requirements of learning data. The collected range processor 112 performs a process of when configuring the collected range of the learning data. The data collection processor 113 performs a process of when collecting image data. The communicator 114 communicates with other devices via a network. Functional units other than the communicator 114 communicates with other devices via the communicator 114.

Hereinafter, for the sake of description, the functional units included in the data collection system 10 may be described as actors of operation. However, the processor 11 actually executes those functional units. In the operation terminals 21 and 31, each of functional units is similarly executed by a processor included in the terminal, respectively.

The storage unit 12 stores a requirement management database (DB) 121, a collected range management DB 122, and an image data management DB 123. The requirement management DB 121 stores results of defining requirements of learning data. The collected range management DB 122 stores results of defining the collected range of learning data. The image data management DB 123 stores the collected image data.

Figure 3:
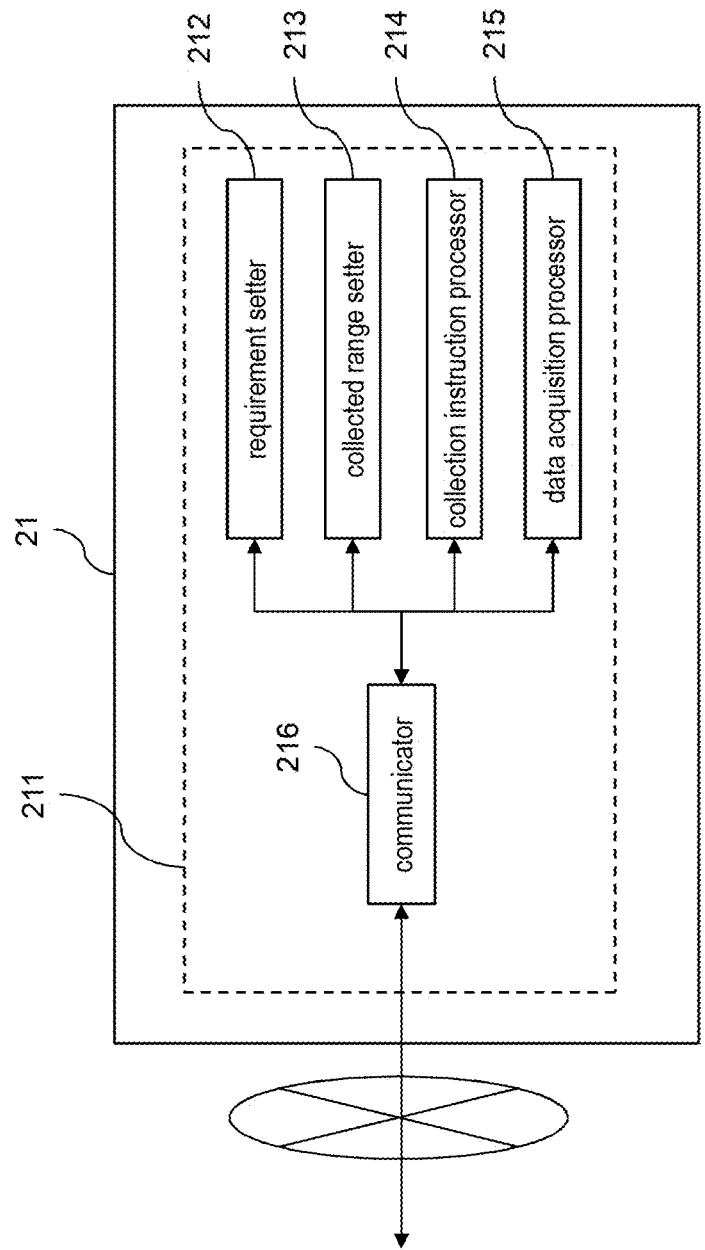
FIG. 3 is a function block diagram of an operation terminal 21.

FIG. 3 is a function block diagram of the operation terminal 21. The operation terminal 21 includes a processor 211. The processor 211 executes a requirement setter 212, a collected range setter 213, a collection instruction processor 214, a data acquisition processor 215, and a communicator 216. These functional units are configured as software modules executable by the processor 211.

The requirement setter 211 performs a process for configuring requirements of learning data. The collected range setter 213 performs a process for configuring the collected range of learning data. The collection instruction processor 214 instructs to collect learning data. The data acquisition processor 215 acquires learning data from the data collection system 10. The communicator 216 communicates with other devices via a network. Functional units other than the communicator 216 communicate with other devices via the communicator 216.

Figure 4:
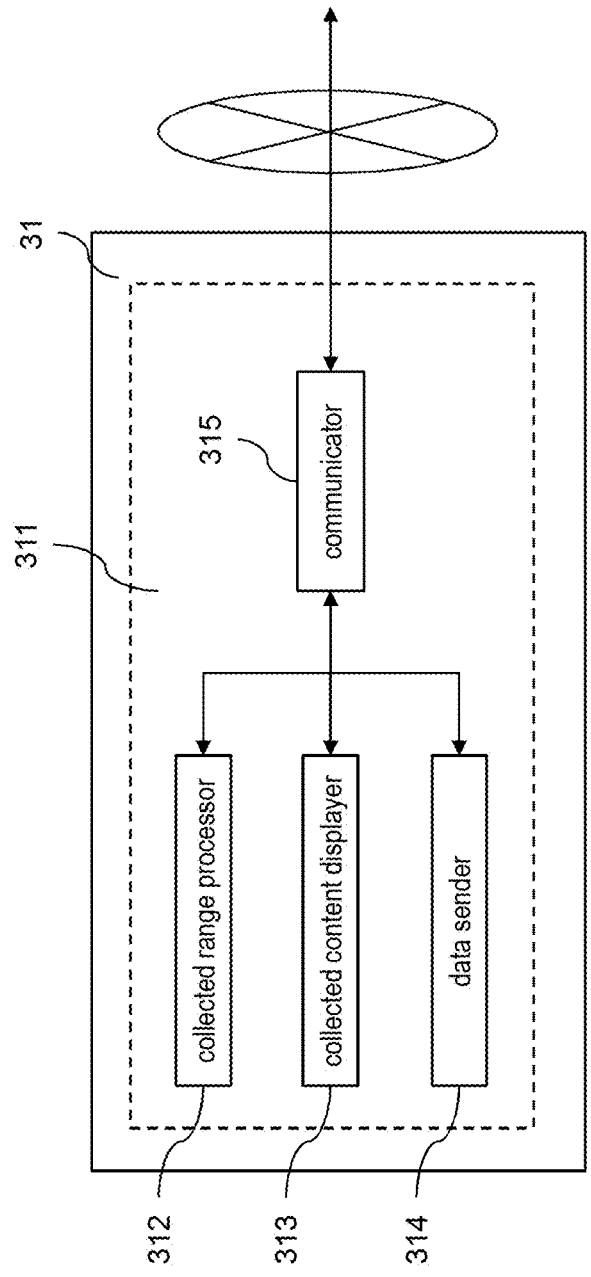
FIG. 4 is a function block diagram of an operation terminal 31.

FIG. 4 is a function block diagram of the operation terminal 31. The operation terminal 31 includes a processor 311. The processor 311 executes a collected range processor 312, a collected content displayer 313, a data sender 314, and a communicator 315. These functional units are configured as software modules executable by the processor 311.

The collected range processor 312 performs a process regarding the collected range of learning data. The collected content displayer 313 displays the collected learning data. The data sender 314 sends the collected learning data to the data collection system 10. The communicator 315 communicates with other devices via a network. Functional units other than the communicator 315 communicates with other devices via the communicator 315.

FIG. 5 is a flowchart that explains an operation of the data collection system 10. Hereinafter, each step in FIG. 5 will be described.

(FIG. 5: Step 1. Define Requirement)

The developer and the requester define a requirement for collecting learning data by communicating with each other. The developer and the requester can communicate about the collection requirement via the data collection system 10. It also applies to steps below. Details of this step will be described in FIG. 6 later.

(FIG. 5: Step 2. Define Collected Range)

The developer and the requester define a range in which the learning data is collected by communicating with each other. The collector can see the defined collected range. After this step, each of persons concerned determines whether the requirement should be corrected. If the requirement should be corrected, the process returns to step 1. If the requirement is not corrected, the process proceeds to step 4. Details of this step will be described in FIG. 10 later.

(FIG. 5: Step 3. Collect and Check Data)

The operation terminal 31 collects learning data according to the requirement and the collected range configured in the data collection system 10. The collector and the developer check the collected learning data on the data collection system 10. If the learning data is not sufficient, the process returns to step 2. If the learning data is sufficient, the process proceeds to step 4. Details of this step will be described in FIG. 13 later.

(FIG. 5: Step 4. Register Data)

The collector or the developer registers the collected learning data into the data collection system 10. The registration in this step is to decide employing the collected learning data for the learner. If the requirement is not modified, this flowchart is finished. If the requirement is modified, the process returns to one of steps 1-3. It will be described later which step is the target of return. Details of this step will be described in FIG. 14 later.

FIG. 6 is a process flow diagram that explains details of step 1. Hereinafter, each step in FIG. 6 will be described.
(FIG. 6: Steps S601-S602)

The developer firstly decides requirement items among the requirement for collecting learning data (S601). The developer decides requirement variables and priorities thereof for each of the requirement items, and then registers them into the data collection system 10 (S602). Specific examples of the requirement items and the requirement variables will be described later. S601-S602 are performed by the requirement setter 212 on the operation terminal 21 and by the requirement definition processor 111 on the data collection system 10. The requirement setter 212 sends requirement definition data that describes the requirement variables and priority data that describes the priorities. The requirement definition processor 111 receives the requirement definition data and the priority data, and then stores them into the requirement management DB 121.
(FIG. 6: step S603)

The developer (or the requester) inputs requirement values into each of the requirement variables. An example of input screen used in this step will be described later. The input screen is provided by the requirement definition processor 111 or by the requirement setter 212. The requirement definition processor 111 receives the inputted requirement values. If the input screen is provided by a server application such as Web application, the requirement definition processor 111 provides the input screen. The screens described below are similarly provided by each functional unit included in the data collection system 10 if such screen is provided as a server application.
(FIG. 6: Step S604)

The developer and the requester mutationally check the list of requirement variables and the requirement values. An example of confirmation screen used in this step will be described later. The confirmation screen is provided by the requirement definition processor 111. The requirement setter 212 displays the confirmation screen.

FIG. 7A is a diagram that illustrates an example of requirement item. The requirement for the leaner identifying images always changes. The requirement variables are categorized into each of requirement items. The requirement items include such as objective requirement, operational requirement, and develop requirement. Hereinafter, each requirement items will be described.

The objective requirement defines such as: a target collected as learning data; an actor that collects the learning data. In many cases, the objective requirement is fixed for each of developing project for collecting learning data. Thus the objective requirement is defined independently from other requirements. If the objective requirement is modified in the last step in FIG. 5, the process returns to step 1.

The operational requirement defines requirements that temporally change. The operational requirement corresponds to requirements that are corrected depending on such change. The operational requirement corresponds to, for example, environmental requirement where the data collection is performed such as date, time, and location. The operational requirement also corresponds to method or procedure for collecting the learning data. For example, configuration parameters of imaging device correspond to such requirement. If the operational requirement is modified in the last step in FIG. 5, the process returns to step 2.

The develop requirement defines technical requirements of the learner. The develop requirement corresponds to requirements that are continuously corrected along with growth of the learner. For example, amount of learning data corresponds to such requirement. If the develop requirement is modified in the last step in FIG. 5, the process returns to step 3.

FIG. 7B is a diagram that illustrates an example of requirement variable. One or more of the requirement variables are configured for each of requirement items. Each requirement variable has a requirement value. Hereinafter, each of requirement variables and requirement values will be described.

Requirement variables of the objective requirement include such as: type of device that captures image data; type of learner (target of learning, algorithm, etc.); imaging target.

Requirement variables of the operational requirement include such as: external environment where the image data is collected; configuration parameters of imaging device. The external environment variable includes such as: date and time; location; weather; peripheral objects. The configuration parameter includes such as: parameters of imaging device, illumination parameters.

Requirement variables of the develop requirement include such as: number of captured image data; ratio of number of capture. The number of capture and the ratio of number of capture may be configured for each captured target or may be configured for each requirement variable. For example, if the ratio of number of capture is configured as target A:target B=1:2, the number of captured image data for target B is twice of target A.

Figure 8:
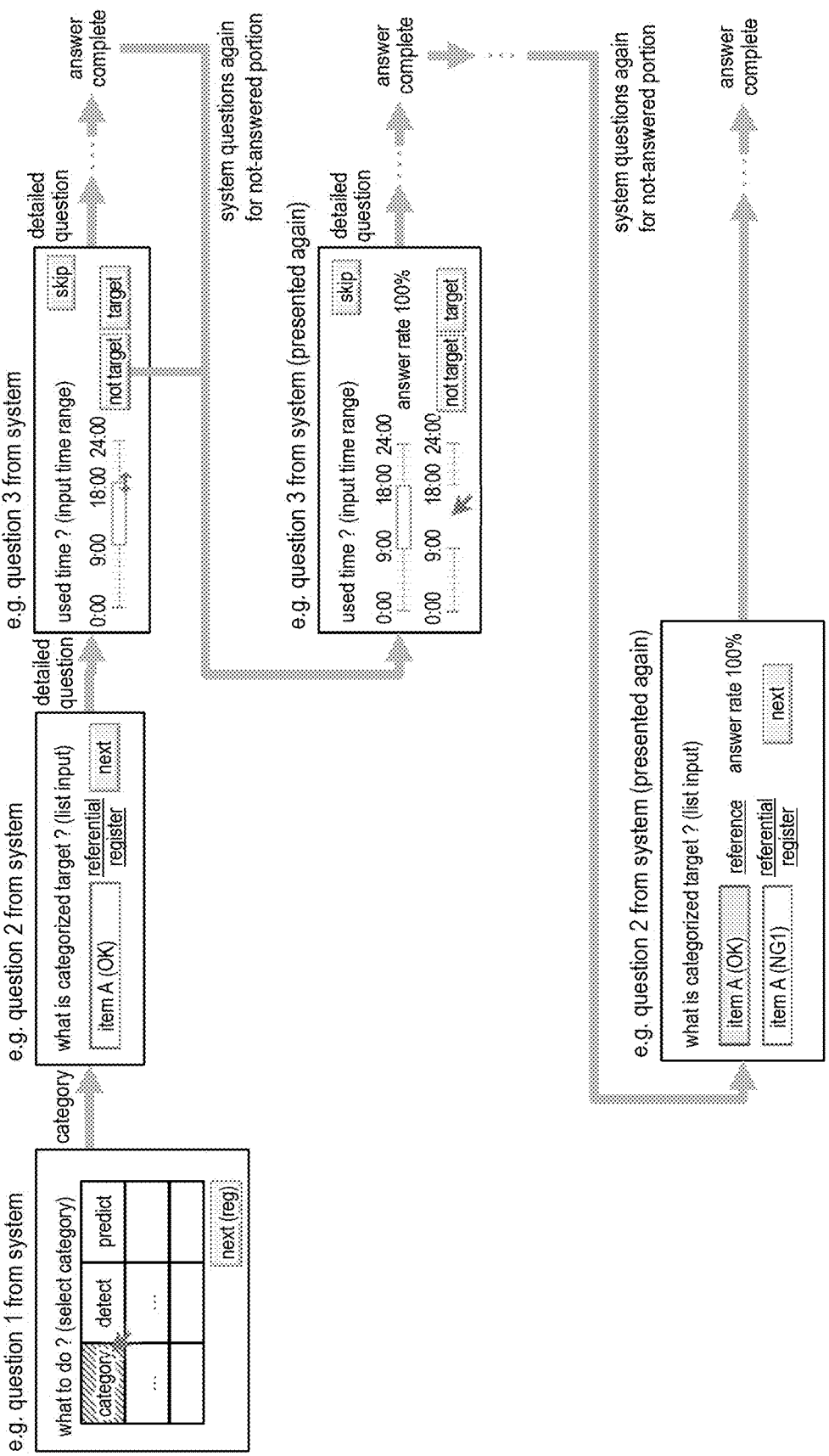
FIG. 8 is a diagram that illustrates a screen transition example of an input screen used in S603.

FIG. 8 is a diagram that illustrates a screen transition example of an input screen used in S603. This screen prompts the developer or the requester to input requirement values in the form of hierarchical questions. The question form is presented in a representation depending on type of requirement variable (list, time, numerical range, etc.). If the answerer skips a question, the system returns to the not-inputted portion to question again. If type of requirement variable represents a finite range (time, location, etc.), the system may question again for the non-inputted range if there remains such not-inputted range in the finite range. The system may present a ratio of answered items or ratio of answered ranges, thereby prompting to answer all question items.

If there remains not-inputted portion or not-inputted range, the system may prompt sequential reinput from high-priority requirement variable toward low-priority requirement variable, or may prompt reinput conversely from low-priority requirement variable toward high-priority requirement variable. However, if the requirement variables are hierarchically constructed, the answerer may be rather perplexed when starting the reinput from higher requirement variables after already inputting intermediate-priority requirement variables. If the requirement variables have such hierarchical structure, it may be desirable to prompt sequential reinput from high-priority requirement variable toward low-priority requirement variable.

Figure 9:
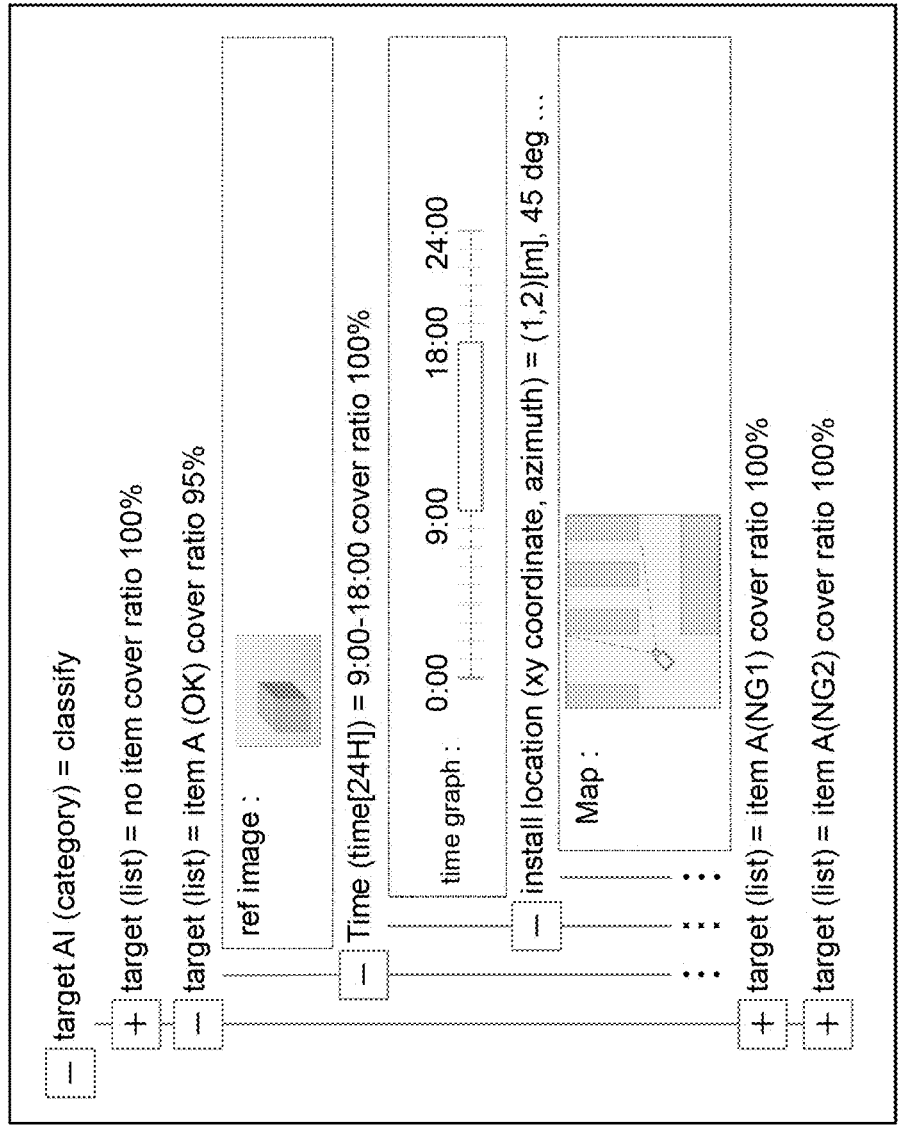
FIG. 9 is a diagram that illustrates an example of a confirmation screen used in S604.

FIG. 9 is a diagram that illustrates an example of a confirmation screen used in S604. This screen presents a list of pairs of requirement variable and requirement value in the form of tree, for example. When sequentially inputting requirement values from higher priority to lower priority, those requirement variables are in hierarchical relationship.

In such case, the screen presents requirement variables such that: as the requirement variable has higher priority, the variable is placed on more upper node. The screen may also present a cover ratio of answered questions for each requirement value of requirement variable (if the answerer skips to answer when inputting requirement, the cover ratio decreases). The screen may present each requirement value by a representation (e.g. graph) depending on type of requirement variable. The developer and the requester can agree the collection requirement by mutually referring to this screen and by checking quantitative numerical values of requirement variables.

Figure 10:
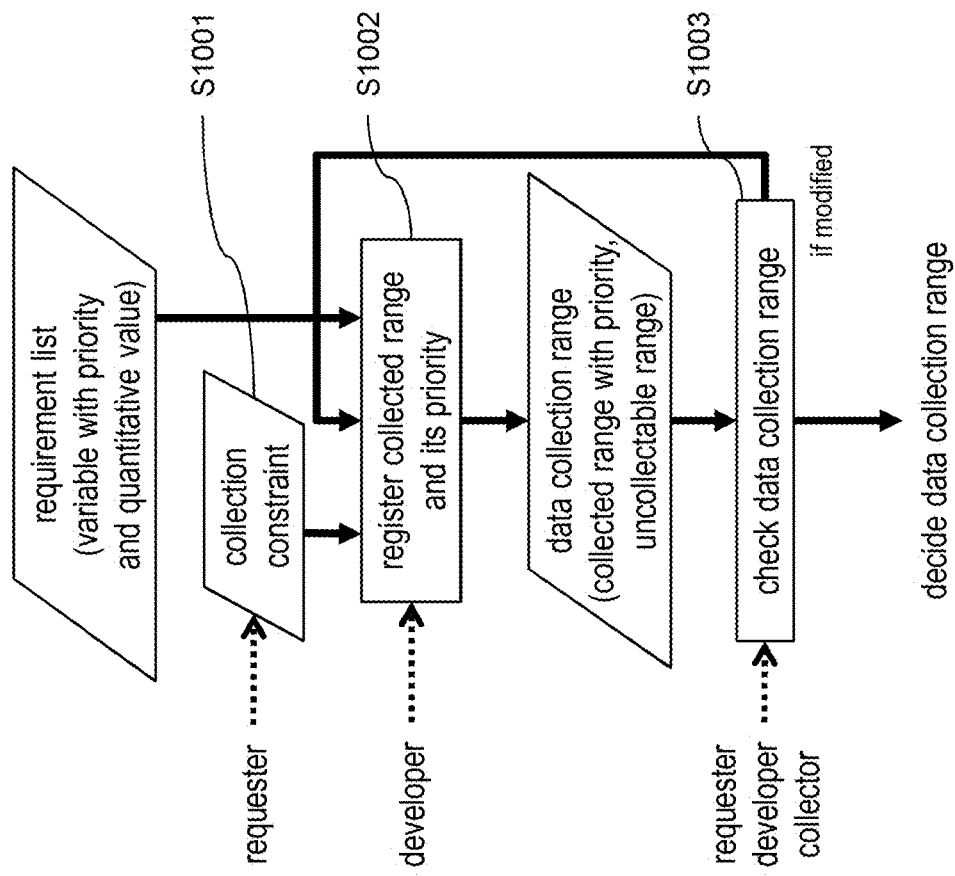
FIG. 10 is a process flow diagram that explains details of step 2.

FIG. 10 is a process flow diagram that explains details of step 2. Hereinafter, each step in FIG. 10 will be described.
(FIG. 10: Step S1001)

If there exists constraint necessary for collecting learning data, the requester notifies the data collection system 10 of the constraint. The constraint may be notified via the developer. The collected range processor 112 may acquire data describing the constraint. Instead of formulating the constraint as data, the developer may manually input the collected range in subsequent steps along with considering the constraint, thereby reflecting the constraint. There are various types of actual constraints, and thus it may be difficult in many cases to formulate the constraint. Thus it is practical to manually input the collected range by the developer along with considering the constraint. Hereinafter, such situation is assumed.
(FIG. 10: Step S1002)

The developer inputs the data collection range and its priority according to requirement variables, requirement values, and the constraint. An example of input screen used in this step will be described later. The input screen is provided by the collected range processor 112. The collected range setter 213 sends collected range data specifying the collected range. The collected range processor 112 receives the collected range data and stores it into the collected range management DB 122. This step configures the data collection range and its priority, and the portions which are not inputted as the collected range are configured as uncollectable range.
(FIG. 10: Step S1003)

The requester, the developer, and the collector check the configured data collection range. If the data collection range is modified, the process returns to S1002. An example of confirmation screen used in this step will be described later. The confirmation screen is provided by the collected range processor 112.

Figure 11:
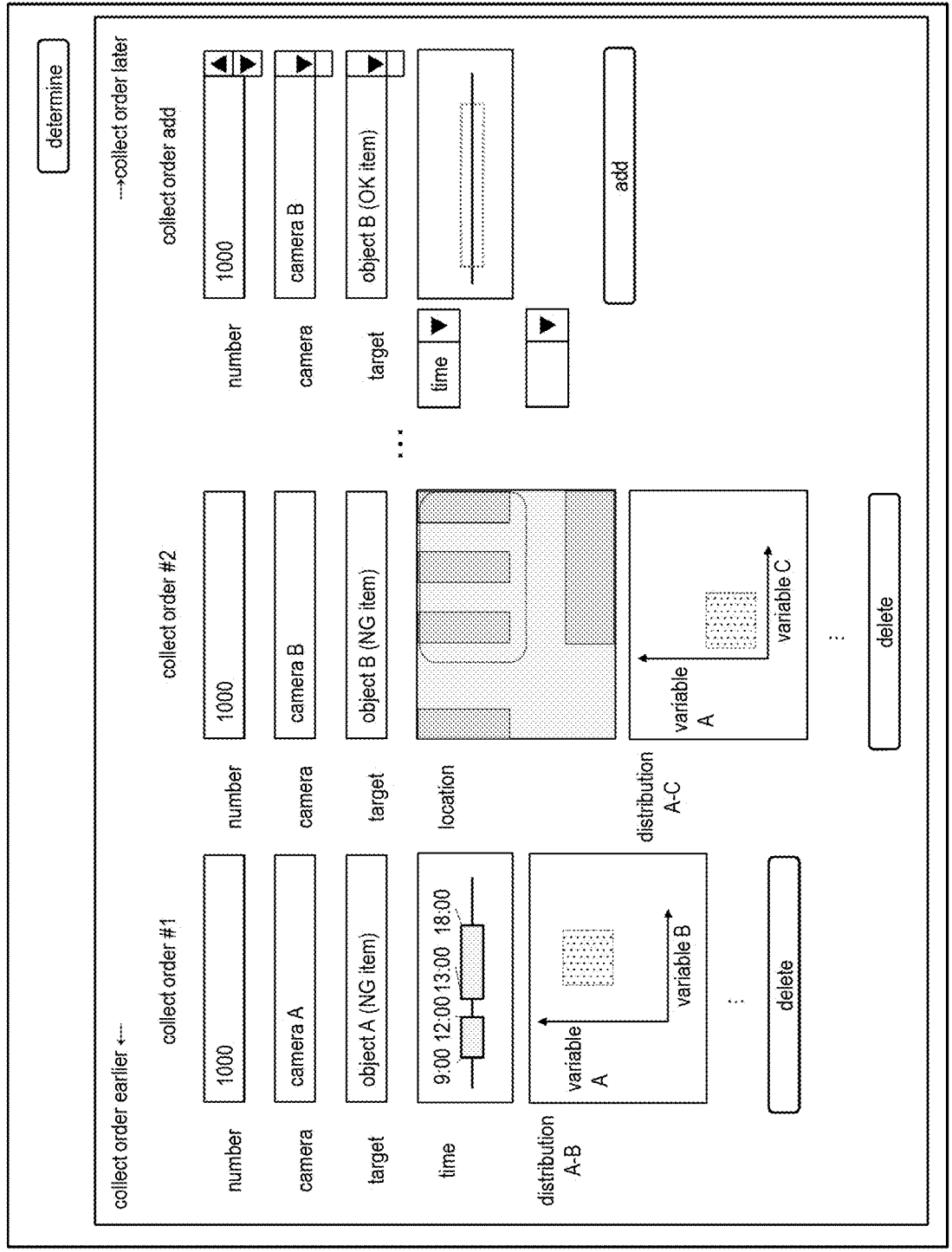
FIG. 11 is a diagram that illustrates an example of an input screen used in S1002.

FIG. 11 is a diagram that illustrates an example of an input screen used in S1002. The requirement variables may be grouped as shown in the tree structure of FIG. 9. FIG. 9 shows an example where the requirement variables are aggregated under assumption that the requirement values are different for each of captured targets. The input screen of FIG. 11 is configured such that the collected range may be inputted for each of the groups. The method of grouping the requirement variables may be determined in advance in the data collection system 10, or may be determined according to the hierarchical relationship of FIG. 9. For example, a requirement variable belonging at or under an uppermost layer which requires inputting requirement values may be grouped under the uppermost variable.

Requirement variables in one group are sorted in the order of priority. In the example of FIG. 11, the number of captured image has a highest priority. Accordingly, it is possible to prompt to preferentially input a requirement variable with higher priority. The form of input may be presented in a representation depending on type of requirement variable (list, time, numerical range, etc.). Regarding requirement variables with constraint, the constrained portion may be configured to be noneditable.

The order of collection may be configured for each group. In FIG. 11, the groups are aligned from left column to right column in the order of group which require learning data collection to be preferentially performed. When adding a new group, the new group is placed at the last order at the time of adding.

The developer inputs the collected range according to the constraint which is recognized by the developer in advance. After inputting all items, the developer presses the determine button. In addition to the range specified by the constraint, the portions which are not inputted in this screen are configured as uncollectable range. Other inputted portions are configured as collected range.

Figure 12:
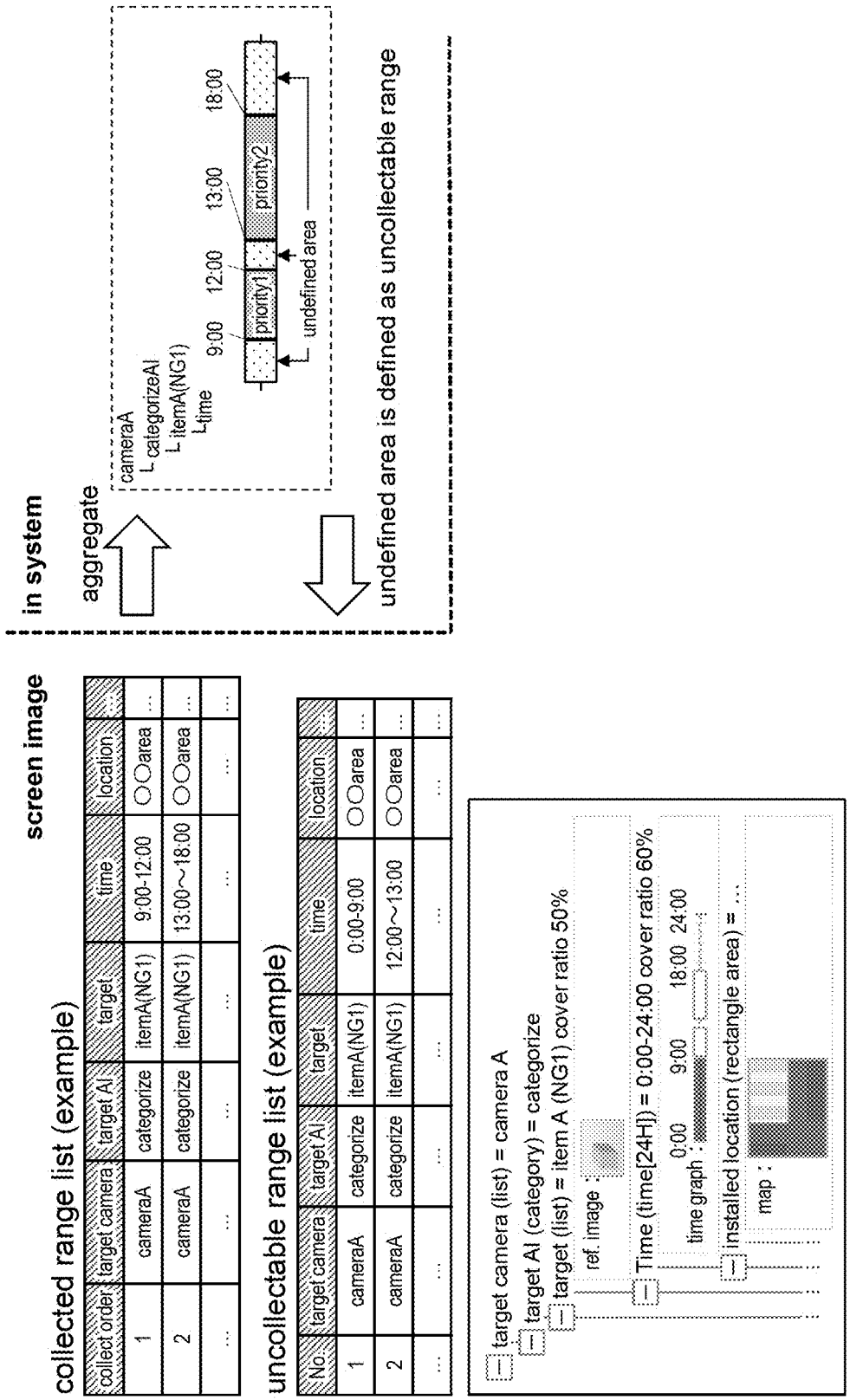
FIG. 12 is a diagram that illustrates an example of a confirmation screen used in S1003.

FIG. 12 is a diagram that illustrates an example of a confirmation screen used in S1003. This screen displays the data collection range in the form of list in the order of collection configured in the input screen of FIG. 11. The tree form shown in FIG. 12 lower diagram may be used simultaneously. The requirement variables in each collection order are displayed in the order of priority.

The collected range processor 112 aggregates the range of requirement variables which are not inputted in the input screen of FIG. 11, and the recognizes those range as uncollectable range. This screen presents the collected range along with the uncollectable range. It is desirable to present the uncollectable range along with the list and the tree. Accordingly, it is possible to prompt reinput when there exists input omissions, for example.

The collected range processor 112 calculates a ratio of portions of requirement variables which are not inputted, and then presents the calculated value as an input cover ratio. Regarding portions that cannot be inputted because of constraint, such portions may or may not be included in the calculation. Accordingly, it is possible to prompt reinput when there exists input omission, for example, in addition to presenting the uncollectable range.

The requester, the developer, and the collector define the data collection plan by checking quantitative numerical values of data collection range on this screen and by agreeing the data collection range. When modifying the collected range, the input screen of FIG. 11 is presented again to prompt reinput.

FIG. 13 is a process flow diagram that explains details of step 3. Hereinafter, each step in FIG. 13 will be described.
(FIG. 13: Step S1301)

The collector collects learning data using imaging devices, for example, according to the determined data collection range. In the embodiment 1, the operation terminal 31 does not automatically work together with the imaging device. The collector manually collects learning data. The collected learning data is raw data and is not associated with requirement variables. Thus the collector associates the learning data with requirement variables 1 requirement values, and then registers it into the data collection system 10. The register screen for performing registering operation will be described later.
(FIG. 13: Step S1302)

The collector and the developer check the collected learning data and the requirement variables on the screen. If collecting operation is continued, the process returns to S1301. The confirmation screen may be same one as the register screen in S1301.

FIG. 14A is a conceptual diagram of a work performed by a collector in S1301. The collector collects learning data using such as imaging device according to the determined collected range. The collected learning data is image data. Thus the learning data itself is not associated with requirement variables. The collector registers learning data and requirement variables into the data collection system 10 in association with each other in order to clarify the requirement variable (and requirement value) on which each collected learning data is based. The additional information in FIG. 14A lower diagram is a specific example of requirement variable and requirement value associated with each other.

FIG. 14B is a diagram that illustrates an example of a registration screen used in S1301. The collector selects image data on the register screen shown at left side of FIG. 14B and inputs each requirement value. The data collection processor 113 receives the selected image data and the inputted requirement value, and then stores them into the image data management DB 123 temporally. The data collection processor 113 compares the determined data collection range with the registered requirement value, thereby identifying uncollected range. The data collection processor 113 presents the uncollected range as a confirmation screen.

The uncollected range may be presented in the form of list as in FIG. 12, may be presented in the form of tree, or may be presented using both. Regarding requirement variables that can be shown in the form of figure such as graph, such variables may be illustrated as shown at right bottom of FIG. 14B. The uncollected range may be presented in the order of collection as configured in FIG. 11.

The data collection processor 113 may compare the determined data collection range with the registered requirement value, thereby calculating a ratio of uncollected portions in the collected range and presenting the ratio as a cover ratio on the confirmation screen. After the collector finishes collecting learning data across all data collection range, the cover ratio is 100%.

By presenting the confirmation screen such as FIG. 14B, the collector is prompted to collect learning data preferentially from the collected range of earlier collection order. By presenting the cover ratio, it is possible to present, to the developer and to the collector, excess or deficiency of collected learning data.

Embodiment 1: Summary

The data collection system 10 according to the embodiment 1 provides a requirement confirmation screen (FIG. 9) used by the requester and the developer to determine the data collection requirement by mutually checking with each other. The data collection system 10 presents each requirement variable in the order of priority of requirement variable on the requirement confirmation screen. Accordingly, it is possible to prompt determining requirement variables from those with higher priority. The requirement confirmation screen presents a ratio of requirement variables which requirement values are determined. Accordingly, it is possible to prompt inputting requirement values including input omission. In other words, the requester and the developer check data collection requirement via the requirement confirmation screen, thereby determining the data collection range under support of the developer. Thus even if the requester (or collector in the subsequent process) does not have detailed technical knowledge, it is possible to determine the collected range without omission and exhaustively.

The data collection system 10 according to the embodiment 1 provides a requirement input screen (FIG. 8) for the developer to input requirement variable/requirement value/ priority. The requirement input screen prompts inputting requirement values in the form of question in the order of requirement variable priority, and prompts reinput for non-inputted portions. Accordingly, the developer can input requirement values without omission and exhaustively.

The data collection system 10 according to the embodiment 1 provides a collected range input screen (FIG. 10) for the developer to input data collection range. The data collection system 10 further provides a collected range confirmation screen (FIG. 12) for the requester/developer/ collector to mutually check the inputted data collection range. By determining the data collection range with those three participants checking the collected range, it is possible to configure the collected range without omission and exhaustively. Accordingly, even if any one of those three participants has small technical knowledge, it is possible to prevent missing consideration for data collection content.

The data collection system 10 according to the embodiment 1 provides a data collection confirmation screen (FIG. 14B) that presents a cover ratio of learning data collected by the collector. Accordingly even if the collector has small technical knowledge or small experience, it is possible to collect the learning data appropriately and exhaustively without omission.

Embodiment 2

In the embodiment 1, the collector manually operates the imaging device, for example, thereby collecting learning data. Alternatively, the operation terminal 31 may connect to the imaging device to control the imaging device, thereby collecting learning data without manual operation of the collector. In this case, the operation terminal 31 (e.g. data sender 314) connects to the imaging device via an application interface included in the imaging device, for example, and then controls the imaging device via the interface. The behavior of the imaging device may be determined according to the data collection range acquired from the data collection system 10.

In this embodiment, it is possible to automatically collect learning data according to the collected range defined by requirement variables and requirement values, thereby it is possible to automatically associate the collected learning data with requirement variables and requirement values. Accordingly, it is not necessary for the collector to associate the learning data with requirement variables/requirement values respectively, thereby improving collection efficiency.

MODIFICATION OF PRESENT DISCLOSURE

In the embodiments above, the requirement variables and the requirement values are merely examples. Some requirement variables or requirement values other than those embodiments above may be configured. Categories of requirement variable other than those embodiments above may be similarly employed.

REFERENCE SIGNS LIST

10: data collection system
11: processor
111: requirement definition processor
112: collected range processor
113: data collection processor 114: communicator
21: operation terminal
31: operation terminal

The invention claimed is:
1. A data collection system that collects image data used to perform learning process for a learner that identifies an image by machine learning, comprising:
a requirement definition processor that receives requirement definition data specifying a requirement variable representing a requirement of the image data and a requirement value of the requirement variable necessary for the learner to sufficiently learn,
wherein the requirement definition processor further receives priority data that specifies a priority of the requirement variable, and
wherein the requirement definition processor further provides a requirement confirmation screen that presents the requirement variable and the requirement value in an order of the priority and that also presents a requirement value answer ratio representing a ratio of the requirement variable in which the requirement value is specified,
wherein the requirement definition processor presents a requirement input screen for a user to input the requirement value,
wherein the requirement input screen is configured to prompt the user to sequentially input the requirement value for each of the requirement variables in order of the priority, and
wherein the requirement input screen is configured to prompt again the user to input the requirement value regarding the requirement variable in which inputting the requirement value is skipped.

2. The data collection system according to claim 1, wherein the requirement variable includes at least one of:
an objective requirement that defines an objective of the learner or of the image data;
an operational requirement that defines an environment where the image data is collected; or
a develop requirement that defines a technical requirement of the learner,
wherein the objective requirement includes at least one of:
camera information that specifies a camera for acquiring the image data;
learner information that specifies an algorithm implementing the learner; or
object information that specifies an object captured by the camera,
wherein the operational requirement includes at least one of:
a date and time when the image data is acquired;
a location where the camera captures the image data;
a weather on a date and time when the image data is acquired;
installed object information that specifies an object installed at a location where the camera captures the image data;
a configuration parameter of the camera; or
an illumination parameter of the camera,
wherein the develop requirement includes at least one of:
a captured number of the image data for each of the object;
a ratio of captured number of the image data between the objects;
a captured number of the image data for each of the requirement variables; or
a ratio of captured number of the image data between the requirement variables.

3. The data collection system according to claim 1, wherein the requirement input screen is configured to prompt again the user to input the requirement value regarding the requirement variable in which inputting the requirement value is skipped from lower one of the priority to higher one of the priority.

4. The data collection system according to claim 1, wherein the requirement confirmation screen is configured to present the requirement variable and the requirement value in a tree form where a pair of the requirement variable and the requirement value is placed sequentially from an upper node according to the priority, and
wherein the requirement confirmation screen is further configured to present a graph showing a numerical range of the requirement value if the requirement variable is defined by numerical range.

5. The data collection system according to claim 1, wherein the requirement variable includes an objective requirement that defines an objective of the learner or an objective of the image data,
wherein if the objective requirement is modified, the requirement definition processor receives again the requirement definition data corresponding to the modified objective requirement,
wherein the requirement definition processor receives again the priority data corresponding to the modified requirement definition data, and
wherein the requirement definition processor presents again the requirement confirmation screen corresponding to the modified requirement definition data.

6. A data collection system that collects image data used to perform learning process for a learner that identifies an image by machine learning, comprising:
a requirement definition processor that receives requirement definition data specifying a requirement variable representing a requirement of the image data and a requirement value of the requirement variable necessary for the learner to sufficiently learn,
wherein the requirement definition processor further receives priority data that specifies a priority of the requirement variable, and
wherein the requirement definition processor further provides a requirement confirmation screen that presents the requirement variable and the requirement value in an order of the priority and that also presents a requirement value answer ratio representing a ratio of the requirement variable in which the requirement value is specified,
wherein the data collection system further comprises a collected range processor that receives collected range data specifying a range in which the image data is collected,
wherein according to the collected range data and a constraint for collecting the image data, the collected range processor determines a collected range in which the image data is collected and an uncollectable range in which the image data is not collected.

7. The data collection system according to claim 6, wherein the collected range processor groups the requirement variables and then sets for each of the groups a rank as a collection rank at which the image data is collected, wherein the collected range processor provides a collected range input screen that presents the group sorted by the collection rank, wherein the collected range input screen is configured such that a user can specify the collected range by inputting the requirement value for each of the groups, and wherein the collected range processor handles, as the uncollectable range, the requirement value or its range that is not inputted on the collected range input screen.

8. The data collection system according to claim 7, wherein the collected range processor provides a collected range confirmation screen that presents the collected range inputted on the collected range input screen in order of the priority and that also presents the uncollectable range determined by being not inputted on the collected range input screen, and wherein the collected range confirmation screen is configured to present a collected range cover ratio that represents a ratio of the requirement variable in which the requirement value is inputted on the collected range input screen.

9. The data collection system according to claim 8, wherein the data collection system further comprises a collection terminal that collects the image data from an imaging device, wherein the data collection system further comprises a storage unit that stores the image data, wherein the collection terminal connects to and controls the imaging device, thereby collecting the image data from the imaging device, and wherein the collection terminal stores the image data collected from the imaging device into the storage unit.

10. The data collection system according to claim 6, further comprising a data collection processor that collects the image data according to the collected range and the uncollectable range, wherein the data collection processor presents a data collection confirmation screen that presents, among the collected range, a collected portion where the image data is collected and an uncollected portion where the image data is not collected yet.

11. The data collection system according to claim 10, wherein the data collection confirmation screen is configured to present the uncollected portion according to order of priority of the requirement variable and to present a ratio of the uncollected portion with respect to the collected range.

12. The data collection system according to claim 11, wherein the data collection confirmation screen is configured to present the collected portion and the uncollected portion comparing to each other.

13. The data collection system according to claim 10, wherein the requirement variable includes a develop requirement that defines a technical requirement of the learner, wherein if the develop requirement is modified, the collected range processor configures again the collected range and the uncollectable range corresponding to the modified develop requirement, wherein the data collection processor collects again the image data according to the modified collected range and the uncollectable range, and wherein the data collection processor presents again the data collection confirmation screen corresponding to the modified collected range and the uncollectable range.

14. The data collection system according to claim 6, wherein the requirement variable includes an operational requirement that defines an environment where the image data is collected, wherein if the operational requirement is modified, the collected range processor receives again the collected range data corresponding to the modified operational requirement, and wherein the collected range processor determines again the collected range and the uncollectable range corresponding to the modified collected range data.

* * * * *